United States Patent [19]
Garnett

[11] 3,854,335
[45] Dec. 17, 1974

[54] FLOWMETER

[75] Inventor: Lawrence Taylor Garnett, Fullerton, Calif.

[73] Assignee: International Telephone and Telegraph Corporation, New York, N.Y.

[22] Filed: Jan. 2, 1973

[21] Appl. No.: 319,988

[52] U.S. Cl. ................................................ 73/233
[51] Int. Cl. .......................................... G01f 15/02
[58] Field of Search ....................................... 73/233

[56] References Cited
UNITED STATES PATENTS

| | | | |
|---|---|---|---|
| 3,169,399 | 2/1965 | Allport et al. | 73/233 |
| 3,301,054 | 1/1967 | Ebert | 73/233 |
| 2,884,793 | 5/1959 | Billeter | 73/233 |

*Primary Examiner*—Herbert Goldstein
*Attorney, Agent, or Firm*—A. Donald Stolzy

[57] ABSTRACT

A flowmeter which indicates what the total volume flow would be at a constant reference temperature $T_r$. This is achieved by employing a variable speed converter, the ratio of the converter output angular velocity to the converter input angular velocity being a variable $R_a$ which is either manually or automatically adjustable with temperature. Adjustments are provided which can be, among others, calibrated as a percent of $t_s$ and as a percent of some constant reference volume thermal coefficient of expansion including, but not limited to, 0.01 per 100°F.

12 Claims, 23 Drawing Figures

PATENTED DEC 17 1974  3,854,335

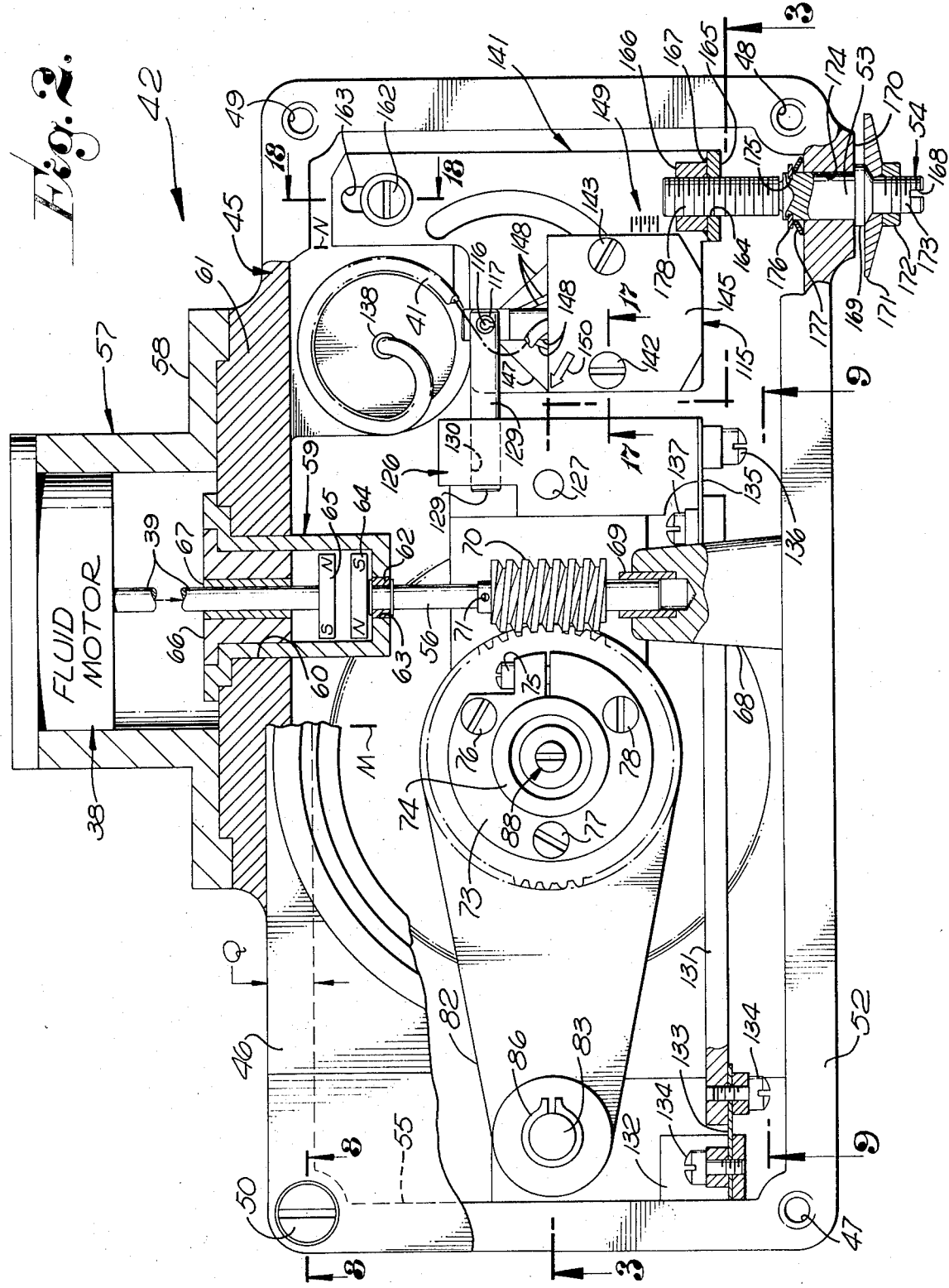

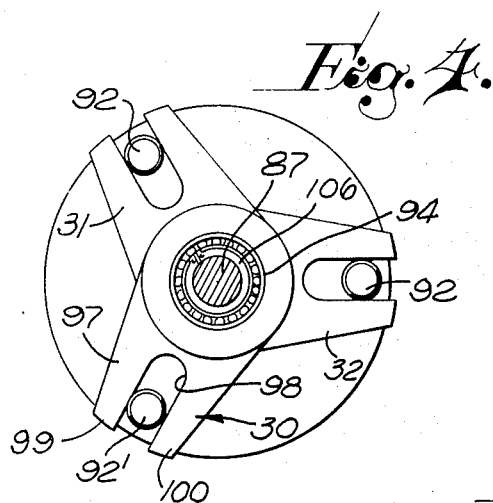
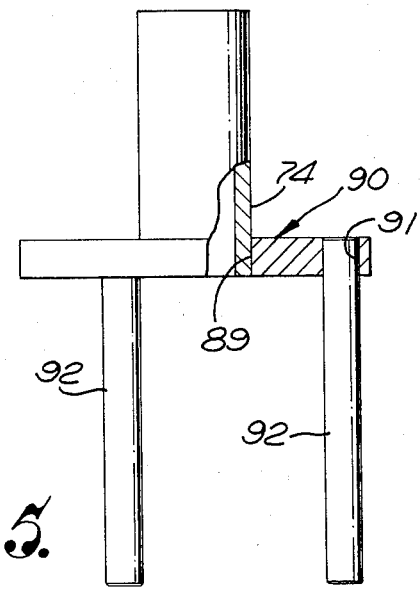
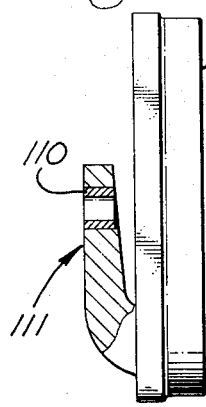
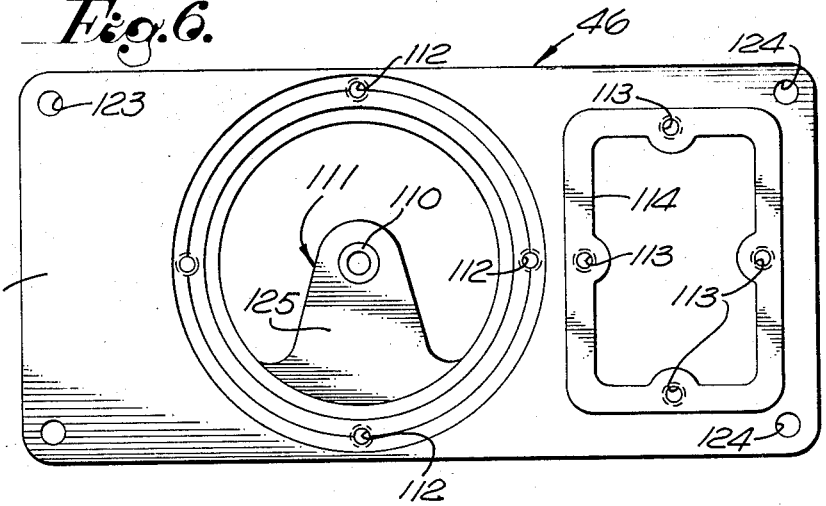
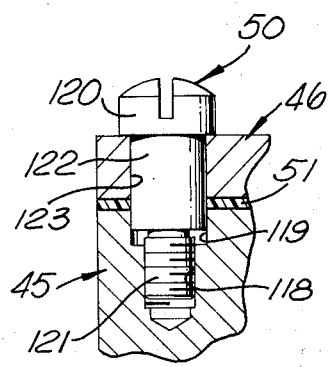
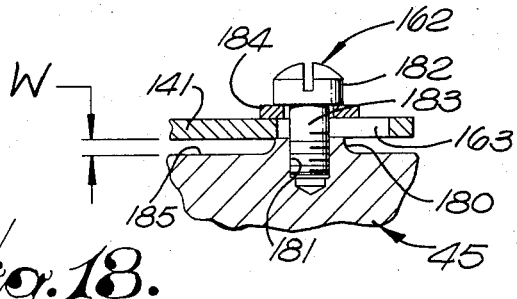

3,854,335

FLOWMETER

BACKGROUND OF THE INVENTION

This invention relates to flowmeters, and more particularly, to apparatus for producing a shaft rotation through an angle which is directly proportional to total volume flow of a fluid as though it were at a constant reference temperature and even though it isn't.

The foregoing is desired even though the temperature of the fluid varies. A revolutions counter connected from a fluid motor can indicate in, for example, gallons per minute. However, for changes in fluid temperature, erroneous readings are obtained from such prior art counters.

SUMMARY OF THE INVENTION

In accordance with the flowmeter of the present invention, a variable and/or adjustable speed converter having an average speed ratio $R_a$ can be employed to manually and/or automatically correct the angular velocity of the output shaft of a fluid motor.

Thus, a revolutions counter can indicate accurately in gallons per minute or the like at a constant temperature including, but not limited to, 60°F. Even though the fluid temperature is not 60°F., the counter indicates total flow as though the fluid were at the constant reference temperature.

The above-described and other advantages of the present invention will be better understood from the followng detailed description when considered in connection with the accompanying drawings.

BRIEF DESCRIPTION OF THE DRAWINGS

In the drawings which are to be regarded as merely illustrative:

FIG. 2 is a broken away top plan view, partly in section, of a variable speed converter shown in FIG. 1;

FIG. 4 is a transverse sectional view of the variable speed converter taken on the line 4—4 shown in FIG. 3;

FIG. 5 is an elevational view, partly in section, of a portion of a driving assembly shown in FIG. 3;

FIG. 6 is a top plan view of a cover plate for the variable speed converter shown in FIGS. 1, 2 and 3;

FIG. 7 is an end elevational view, partly in section, of the left end of the converter cover plate, as viewed in FIG. 6;

FIG. 8 is a vertical sectional view through one corner of the converter and cover plate therefor taken on the line 8—8 shown in FIG. 2;

FIG. 9 is a side elevational view of a portion of the converter taken on the line 9—9 shown in FIG. 2;

FIG. 18 is a vertical sectional view through the center of an adjustable plate clamp screw on the converter taken on the line 18—18 shown in FIG. 2;

DESCRIPTION OF THE PREFERRED EMBODIMENTS

THE EMBODIMENT OF FIGS. 1-19, INCLUSIVE

Figure 1:
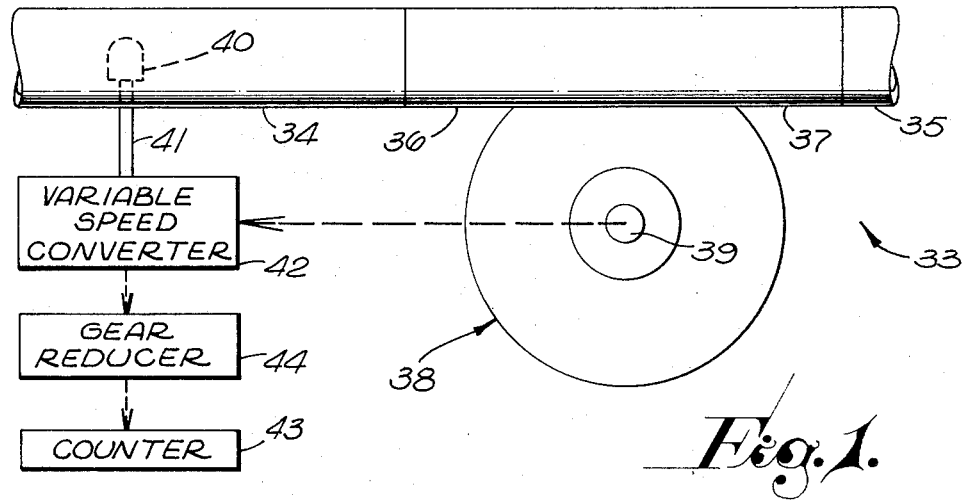
FIG. 1 is a schematic diagram of a flowmeter constructed in accordance with the present invention.

In the drawings, in FIG. 1, a flowmeter is illustrated at 33 including pipe sections 34 and 35 connected to the inlet 36 and outlet 37 of a conventional fluid motor 38. Fluid motor 38 has an output shaft 39.

Ideally, the output shaft 39 of fluid motor 38 turns at a single velocity direction proportional to the volume rate of fluid flow into its inlet 36 and out of its outlet 37.

It is, of course, never possible to construct a perfect instrument. There are always limitations on the accuracy with which a structure may be fabricated. However, flowmeter 33 may be any conventional flowmeter. Such a flowmeter thus produces an output shaft angular velocity which is quite accurate to the volume flow rate for practical purposes.

Figure 20:
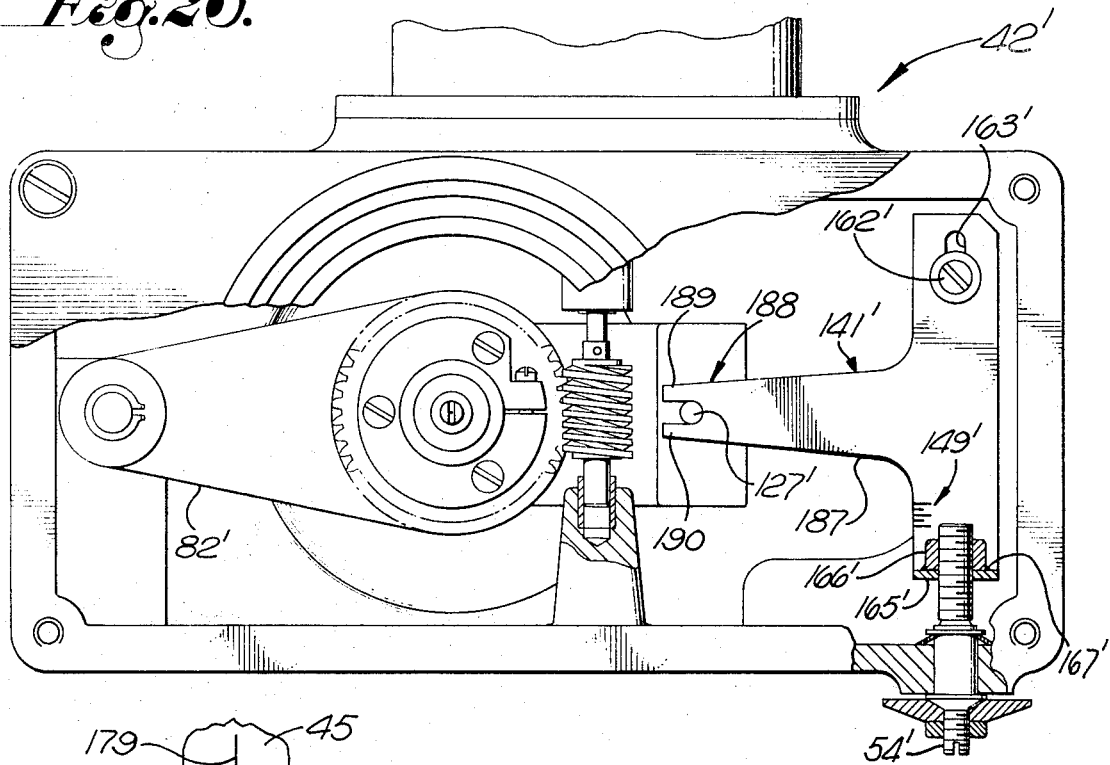
FIG. 20 is a broken away top plan view, partly in section, of a variable speed converter which is an alternative embodiment of the present invention.

The embodiment of the present invention illustrated in FIG. 1 is different from that illustrated in FIG. 20. The differences will become apparent from the description hereinafter and from closer inspection of all the drawings.

The flowmeter incorporating the structure of FIG. 20 may be identical to that shown in FIG. 1, except that a variable speed converter is employed in connection with the structure in FIG. 20 which does not require a temperature input. Except for this and other differences that will be apparent and will be described, the embodiment incorporating the variable speed converter of FIG. 20 may be employed with all the structures shown in FIG. 1 except a temperature sensor 40, and a capillary tube 41 which is connected from sensor 40 to a variable speed converter 42.

The output of converter 42 is impressed upon a counter 43 via a gear reducer 44.

As shown in FIG. 2, converter 42 has a housing 45 and a cover plate 46 thereon which may be fixed to housing 45 by four screws, only one of which is illustrated at 50. The three other screws, not shown, are, when assembled, threaded in housing poles 47, 48 and 49. In order to keep cover 46 in place and properly located, preferably screw 50 is a shoulder screw as shown in FIG. 8.

As shown in FIG. 8, a gasket 51 is provided between cover plate 46 and the converter housing 45. Gasket 51 merely provides a dust seal and is merely made of a material for that purpose. Gasket 51 may have top plan dimensions exacly the same size as the top surface 52 of housing 45 shown in FIG. 2. Surface 52 may have the same general appearance as shown including the fixed portion of housing 45 around a portion 53 of an adjustment screw 54, and as shown at 55.

From a location M, in a direction to the right as viewed in FIG. 2, to a location N, the top surface 52 of housing 45 has a uniform width equal to Q.

In FIG. 2, the input to the converter 42 is supplied to a shaft 56 from fluid motor 38. Shaft 56 is driven synchronously at the same speed as the output shaft 39 of fluid motor 38 is driven.

In FIG. 2, a cylinder 57 having a flange 58 integral therewith is provided. Flange 58 is fixed to housing 45. Fluid motor 38 is fixed to cylinder 57.

A cylinder 59 is fixed through a bore 60 through a wall 61 of housing 45. A bearing 62 is press fit into a bore 63 in the lower closed end of cylinder 59. Shaft 56 is journaled in bearing 62. Shaft 56 may have grooves on opposite sides of bearing 62, if desired, and a snap ring in each one of those grooves. This groove and snap ring arrangement will, therefore, prevent any substantial axial movement of shaft 56 while still permitting it to rotate freely. This will also prevent magnets 64 and 65 from touching each other, magnets 64 and 65 being fixed relative to shafts 56 and 39, respectively.

Cylinder 59 is fixed relative to housing 45. A plug 66 is fixed relative to cylinder 59. A bearing 67 is press fit into plug 66. Shaft 39 is journaled in bearing 67.

Housing 45 has a projection 68 into which a bearing 69 is press fit. The lower end of shaft 56, as viewed in FIG. 2, is then journaled in bearing 69.

A worm 70 is fixed relative to shaft 56 by a set screw 71.

Figure 3:
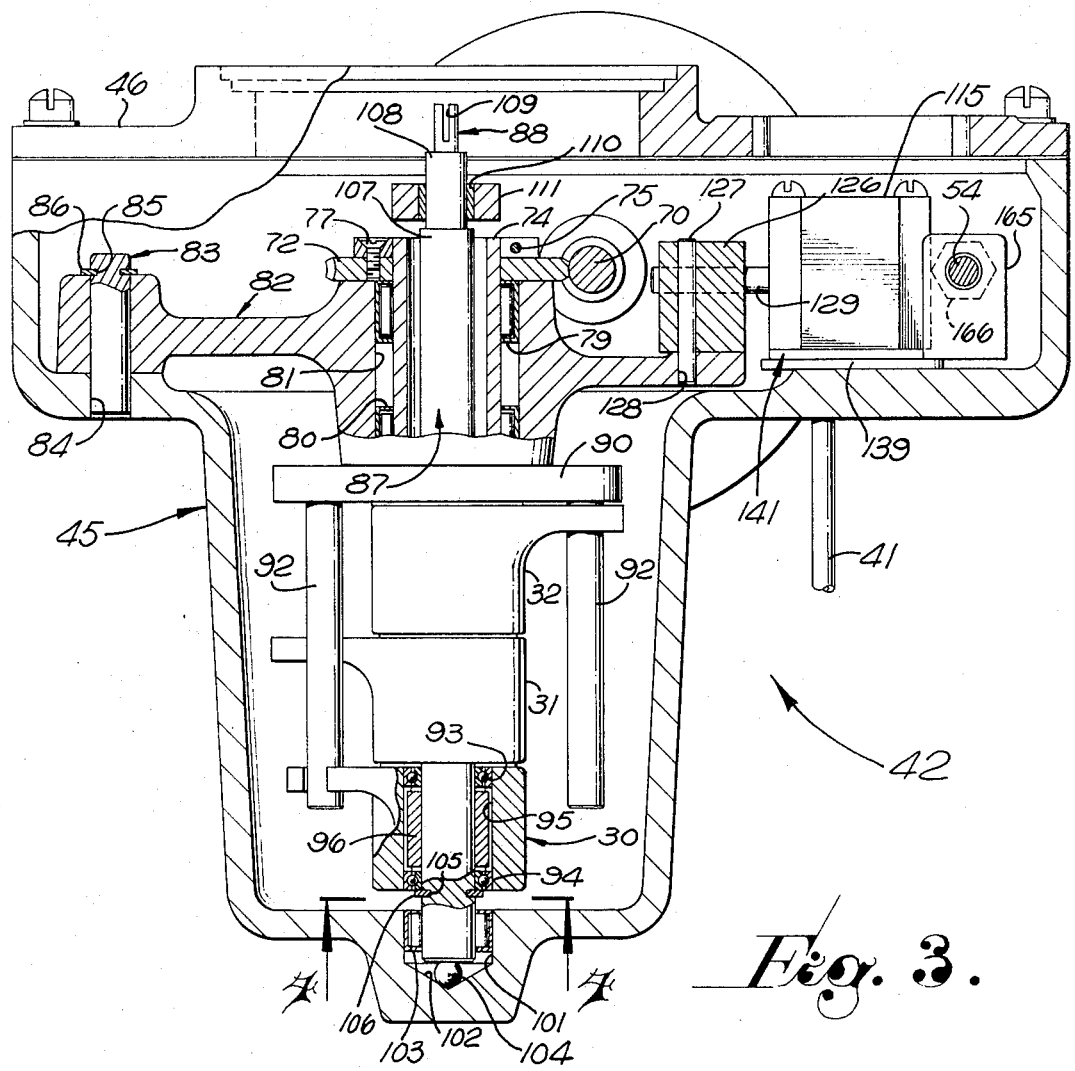
FIG. 3 is a vertical sectional view through the variable speed converter taken on the line 3—3 shown in FIG. 2.

Worm 70 engages a worm gear 72 shown in FIG. 3.

In FIG. 2, a clamp ring 73 is clamped to a cylinder 74 by a set screw 75 before screws 76, 77 and 78 are tightened. After clamp ring 73 is tightened to cylinder 74, screws 76, 77 and 78 are tightened. The screws 76, 77 and 78 thus hold worm gear 72 in a fixed position relative to both clamp ring 73 and cylinder 74.

As shown in FIG. 3, cylinder 74 is rotatable in roller bearings 79 and 80 press fit into a bore 81 of an arm 82 which is pivoted about a pin 83 press fit into a bore 84 through the wall of converter housing 45.

Pin 83 has a groove 85 in which a conventional snap ring 86 is located to prevent axial movement upwardly or downwardly of arm 82 on pin 83.

The converter 42 has an output shaft 87 which is provided with a bifurcated end portion 88 for connection with any gear reducer 44. Any conventional coupling may be provided between end portion 88 of converter output shaft 87 and gear reducer 44.

As shown in FIG. 5, cylinder 74, which may sometimes be described as a "hollow shaft" or simply as a "shaft," or as an "input shaft" hereinafter, is press fit into a bore 89 of an annular disc 90. Disc 90 has three holes 91 therethrough, only one of which is shown in FIG. 5. All of the holes 91 may be defined, if desired, by cylindrical surfaces, the axes of which are parallel to the symmetrical axis of cylinder 74. Each axis of the holes 91 is disposed at the same radial distance from the axis of cylinder 74. The holes 91 are symmetrically spaced 120° around the axis of cylinder 74. Three shafts 92 are press fit in the three holes 91, respectively. The typical position of each shaft 92 in a hole 91 is shown in FIG. 5.

Each of the shafts 92 drive a corresponding one, and only one, of the members 30, 31 and 32, as shown in FIGS. 3 and 4.

Each of the shafts 92 may be identical to the other two shafts, as desired. Also, if desired, members 31 and 32 may be identical to each other. Similarly, members 30 and 31 may be identical to each other. Each of the members 30, 31 and 32 may have a structure internal thereof which surrounds shaft 87. Such a structure is shown internal of member 30. A structure, which may be identical to the structure internal of member 30 around shaft 87, may be employed internally of both members 31 and 32. Thus, the structure internal of member 30 around shaft 87 will be the only one of such structure which will be described.

In FIG. 3, inside member 30, ball bearings are press fit at 93 and 94 into a bore 95 in member 30. An overrunning clutch 96, however, is first press fit to bore 95 before bearings 93 and 94 are assembled. Overrunning clutch 96 may be entirely conventional.

Because each of the members 30, 31 and 32 may be identical, only member 30 will be described in connection with FIG. 4. In FIG. 4, member 30 has a projection 97 with a slot 98 therein. Slot 98 forms a fork having prongs 99 and 100 which straddle a particular corresponding one 92' of the pins 92.

In FIG. 3, housing 45 has a bore 101 therein, at the bottom, as viewed in FIG. 3. Bore 101 terminates in a conical recess 102. A roller bearing 103 is press fit in bore 101. Shaft 87 projects through bearing 103. A thrust ball bearing 104 is provided in recess 102. Ball 104 rests against the recess 102 and supports the shaft 87 at its lower end.

Shaft 87 has a groove 105 into which a snap ring 106 is fitted.

The upper end of shaft 87 includes a lower portion 107, an intermediate portion 108 and an upper portion 88. Portion 108 has a diamter less than the diameter of portion 107. Similarly, portion 88 has a diameter less than the diameter of portion 108. Portion 88 is bifurcated at 109. The intermediate portion 108 of shaft 87 is journaled in a bearing 110 which is press fit in a projection 111 of cover plate 46.

As shown in FIG. 6, cover plate 46 has tapped holes 112 for mounting gear reducer 44 thereon. Cover plate 46 also has an opening 114 for inspection and adjustment of the position of a bellows assembly 115 about the, more or less, symmetrical axis 116 of a spring pin 117 shown in FIG. 2 when the temperature of the fluid flowing in pipe section 34 shown in FIG. 1 is equal to a reference temperature.

Cover plate 46 has an inspection port to which a cover may be fixed by means including tapped holes 113 in cover plate 46.

As shown in FIG. 8, housing 45 has a tapped hole 118 with a counterbore 119. Screw 50 has a head 120 and a shank 121 that is threaded into tapped hole 118.

Screw 50 has a shank portion 122 which is slidable in housing bore 119. Cover plate 46 has a bore 123 through which shank portion 122 of screw 50 is slidable. Bore 123 is also shown in FIG. 6. Cover plate 46 has holes 124 for the other three screws, not shown.

Cover plate projection 111 has a surface 125 of projection 111 which does not lie in the same plane as the top surface 126 of cover plate 46. FIG. 7 is a true left end elevational view of the cover plate 46 shown in FIG. 6, although the view of FIG. 7 is partly in section.

As shown in FIGS. 2 and 3, the symmetrical axis of shaft 87 is the same as that of cylinder 74. However, arm 82 can be rotated about the symmetrical axis of pin 83. This then places the axis of cylinder 74 eccentric to the axis of shaft 87. A mechanism is provided for doing so.

In the first place, arm 82 forms one link of a four link mechanism, one link of which is ground. A second link includes a block 126 shown in both FIGS. 2 and 3. Block 126 is rotatable on a pin 127 that is press fit into a hole 128 in arm 82. This is shown in both FIGS. 2 and 3. Block 126 is moved in an upward direction, as viewed in FIG. 2, by a pin 129 that is slidable in bore 130 that extends all the way through block 126.

The fourth link of the four link mechanism includes a rigid bar 131 shown in FIG. 2. An L-shaped bracket 132 is fixed to the interior of housing 45. A leaf spring hinge 133 is fixed to bracket 132 by a screw 134. The other end of hinge 133 is fixed to bar 131 by a screw 134. Similarly, at the other end of the bar, a leaf spring hinge 135 is fixed to portion 126 by a screw 136, and to bar 131 by a screw 137.

Figure 15:
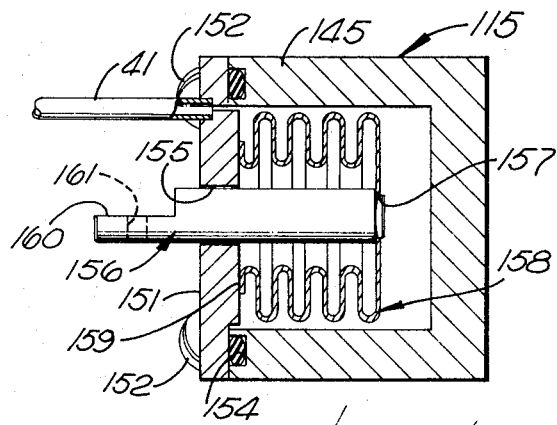
FIG. 15 is a vertical sectional view through the bellows assembly taken on the line 15—15 shown in FIG. 14.

As shown in FIG. 3, capillary tube 41 extends through the wall of housing 45. It may be sealed through the wall of housing 45 at 138, if desired, as shown in FIG. 2. Capillary tube 41 then enters bellows assembly 115 as shown in FIG. 15. Bellows assembly 115 is mounted on a triangular plate 139 shown in FIG. 12. Triangular plate 139 is pivoted about a spring pin 140 which is press fit through reigstering holes in plate 39 and an adjustment plate 141.

Figure 17:
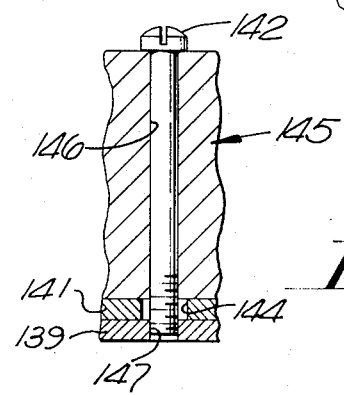
FIG. 17 is a vertical sectional view through the center of a mounting screw for the bellows assembly on the converter taken on the line 17—17 shown in FIG. 2.

Bellows assembly 115 has mounting screws 142 and 143. Only the detail of screw 142 is shown in FIG. 17. This showing is typical for both of the screws 142 and 143.

Figure 12:
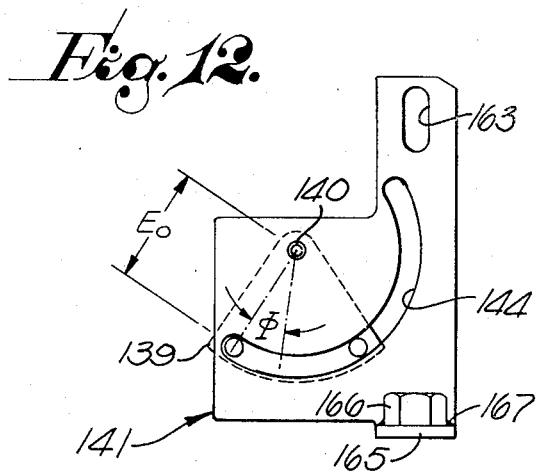
FIG. 12 is a top plan view of an adjustment plate assembly shown in FIGS. 2 and 3.

As shown in FIG. 12, plate 141 has an arcuate slot 144 downwardly through which screws 142 and 140 project. See FIG. 17.

Assembly 115 has a case 145. Case 145 has a hole 146 therethrough through which screw 142 projects and is threaded into a corresponding tapped hole 147 in triangular plate 149.

In accordance with the foregoing, the position of triangular plate 139 and the bellows assembly 115, which is attached to it, is adjustable by loosening screws 142 and 143 and rotating the bellows assembly 115 and plate 139 about the, more or less, symmetrical axis of spring pin 140. When a proper position has been selected, screws 142 and 143 are tightened to clamp case 145 and plate 141 tightly together so that they are fixed relative to each other.

As will be explained, indicia can be provided at two locations on plate 141. Indicia is provided at 147 and 148. Indicia is also provided at 149. Indicia 147, 148 and 149 are shown in FIG. 2. Line 147 in FIG. 2 is a line which can be identified as $\phi = 0$. See FIG. 12. The index mark for the indicia 147 and 148 is the upper left-hand corner of case 145, as indicated by an arrow 150.

Figure 14:
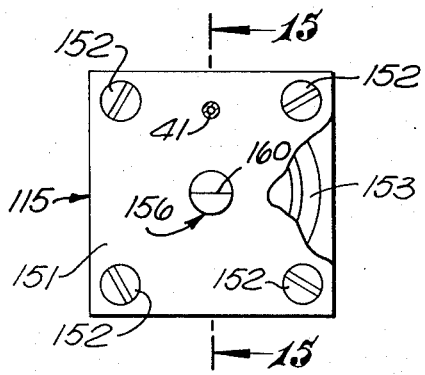
FIG. 14 is a broken away front elevational view, partly in section, of a bellows assembly shown in FIGS. 2 and 3.

As shown in FIG. 14, bellows assembly 115 has an end cover 151 secured to case 145 by four screws 152. Case 145 has a surface which mates with the cover 151, this surface having an O-ring groove 153 therein, the O-ring is shown at 154 in FIG. 15. Cover 151 has a hole 155 therethrough through which a pin 156 is slidable. Pin 156 is sealed through an opening 157 in a bellows 158. Bellows 158 has a fixed end which is fixed to and sealed to cover 151 around hole 155 as indicated at 159.

Bulb 40 and capillary tube 41 may be entirely conventional. If desired, the bellows assembly 115, shown in FIGS. 14, 15 and 16, may also be entirely conventional. Bulb 40, capillary tube 41 and the interior of case 145 sealed off by cover 151 are completely filled with an incompressible, thermally expansible fluid. Any conventional fluid of this type may be employed. Notwithstanding the foregoing, it will be appreciated that the interior of bellows 158 is not filled with the said thermally expansible fluid. Moreover, a vent hole may be provided, not from the exterior of the case 145 into cover 151 through the cover between the location of hole 155 and the position of bellows 158. However, in general, the hole 155 will be sufficiently oversize that air can enter into and pass out of the interior of bellows 158, this space being sealed off except by the opening between pin 156 and the surface of cover 151 defining hole 155.

Figure 16:
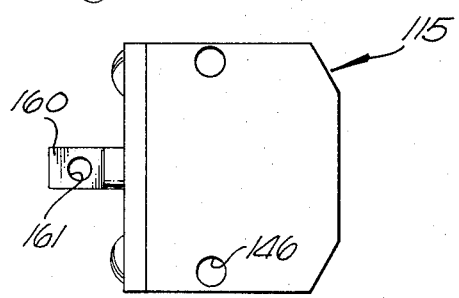
FIG. 16 is a top plan view of the bellows assembly shown in FIGS. 14 and 15.

From FIGS. 14, 15 and 16, it will be noted that pin 156 has a flat at 160 and a hole 161 therethrough through which spring pin 117 is press fit. Spring 117 is also press fit through a registering hole through pin 129. Pin 129 may or may not have a mating flat for plate 160, as desired.

Adjustment plate 141 may be moved only in a vertical direction, as viewed in FIG. 2. This may be done by unloosening a clamp screw 162. The linear movement of adjustment plate 141 is guided on two accounts. In the first place, adjustment plate 141 has a slot 163 therein through which screw 162 projects. In the second place, adjustment screw 54 is slidable through a hole 164 in a tab 165 integral with adjustment plate 141, but is also threaded into a nut 166, which is welded at 167 to tab 165, the axis of hole 164 being identical to the axis of nut 166.

As shown in FIG. 2, screw 54 has a screwdriver slot 168 in its lower end, as viewed in FIG. 2. Screw 54 has an integral flange 169 which abuts an outer face 170 of housing 45. An annular indicator disc 171 is adjustably fixed in position by being clamped tightly between flange 169 and a jam nut 172 threaded to portion 173 of screw 54.

Screw portion 53 is cylindrical and is rotatable through a bore 174 through the wall of housing 45. Screw 54 has a groove 175. A snap ring 176 is fitted into groove 175. A Belleville spring 177 is held, at all times, in compression between snap ring 176 and the interior surface of housing 45. The portion 178 of screw 54 is that portion which is threaded through nut 166.

Another view of leaf spring hinges 133 and 135 is illustrated in FIG. 9.

Figure 10:
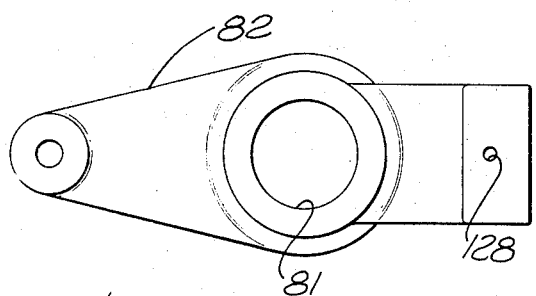
FIG. 10 is a top plan view of an arm of the converter shown in FIGS. 2 and 3.
Figure 11:
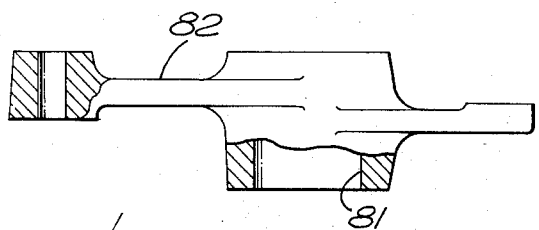
FIG. 11 is a side elevational view, partly in section, of the arm shown in FIG. 10.
Figure 13:
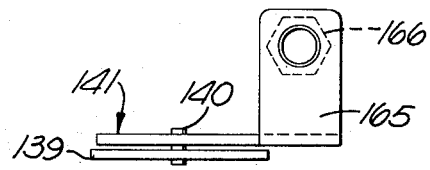
FIG. 13 is a rear elevational view of the adjustment plate assembly shown in FIG. 12.

Arm 82 is illustrated again in FIGS. 10 and 11.

Figure 19:
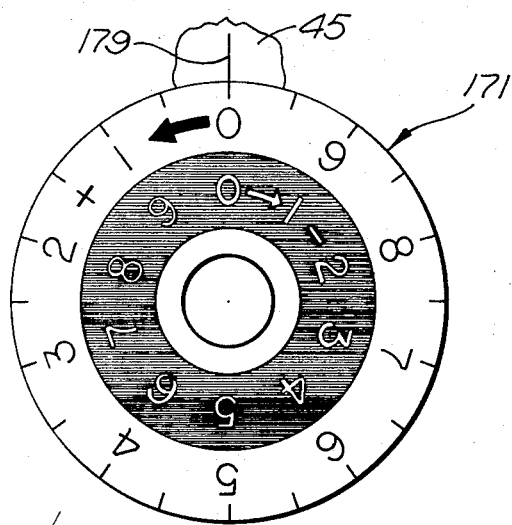
FIG. 19 is an enlarged view of an annular disc which is adjustably fixed to a converter adjustment screw shown in FIG. 2.

The pitch of the thread on portion 178 of screw 54 may be selected, if desired, to give a 1 percent thermal expansion coefficient correction for one turn of screw 54, if desired. Similarly, disc 171 may be calibrated in tenths of one turn. See FIG. 19. Each hole division on disc 171, thus, represents one-tenth of 1 percent. The indicia on disc 171 may be correlated with an index mark 179 on housing 45, as shown in FIG. 19.

As stated previously, after the angular adjustment is made of bellows assembly 115, it is fixed to adjustment plate 141 by screws 142 and 143.

Screws 142 and 143 are loosened to make the adjustment. Similarly, clamp screw 162 is loosened to make the adjustment with adjustment screw 54. After the adjustment is made by adjustment screw 54, clamp screw 162, which is threaded into housing 54, is screwed in tight to clamp adjustment plate 141 and to hold it in a fixed position relative to housing 45.

As shown in FIG. 18, housing 45 has an upwardly projecting boss 180 integral therewith. A tapped hole 181 is provided through boss 180. Screw 162 has a head 182 and a shank 183. Shank 183 is threaded into tapped hole 181. A washer 184 is provided around screw shank 183 between the head 182 of screw 162 and adjustment plate 141.

Housing 45 has a surface 185 above which boss 180 projects. The top surface of boss 180 is, therefore, spaced from surface 185 a distance W. The distance $W$ is preferably not much less than, equal to or not much greater than the thickness of triangular plate 139.

The indicia 149 on adjustment plate 141, shown in FIG. 2, is employed to keep track of the number of turns of adjustment screw 54. Each mark of the indicia 149 may be employed to represent one or two turns of screw 54, as desired.

OPERATION OF THE EMBODIMENT OF FIGS. 1-19, INCLUSIVE

In the operation of the embodiment shown in FIG. 1, the angular position of bellows assembly 115 may be adjusted first or the adjustment screw 54 may be turned first. If the position of bellows assembly 115 is adjusted first, it is possible thereby, by correlating index arrow 150 with indicia 147 and/or 148, to set the flowmeter of the present invention so that the variation in the gear ratio between the converter input and output shafts 74 and 87 is such that counter 43 will record total flow in, for example, gallons, which gallons will be referred to a constant reference temperature. This is made possible even though the temperature of the fluid flowing in pipe section 34 varies with time.

The adjustment of screw 54 is made by loosening clamp screw 162, and turning adjustment screw 54 to a proper setting. Referred to a differential temperature, a maximum temperature or a reference temperature, or to both a maximum and reference temperature, as desired.

Thus, in the operation of the embodiment of the invention of FIG. 1, fluid motor output shaft 39 will turn at a rate directly proportional to the volume rate of fluid flow through the fluid motor 38. Responsive to the temperature of the fluid inside bulb 40, which temperature will be the same as the temperature of the fluid to be metered flowing in pipe section 34, the angular velocity of the fluid motor output shaft 39 is converted to a different velocity corresponding to the temperature of the fluid to be metered. The output of converter 42 in FIG. 1 is then directly proportional to what the speed of the fluid motor output shaft 39 would be if the fluid to be metered were at a reference temperature rather than at a temperature above or below the reference temperature.

Gear reducer 44 reduces the speed of the output of converter 42 to a still lower speed. The purpose of gear reducer 44 will be more apparent from the discussion hereinafter.

Counter 43 may be any conventional revolutions counter of a type similar to that employed as odometers. If desired, gear ratio increases and gear ratio decreases may be provided in the system of FIG. 1 in addition to the gear reducer 44. Gear reducer 44 may, thus, have a gear ratio which is constant, but includes more than one feature, one of the counters being that disclosed hereinafter as $R_g$. Gear reducer 44 provides a constant gear reduction between variable speed reducer 42 and counter 43. If desired, counter 43 may register total flow of the fluid flowing in pipe section 34 in, for example, gallons.

THE EMBODIMENT OF FIG. 20

The embodiment of FIG. 20 may be identical to the embodiment of FIGS. 1-19, inclusive, except that no temperature correction is made continuously. For example, if the fluid flowing in passage section 34 generally flows at a constant temperature, a screw adjustment 54' may be provided to change the said temperature differential, maximum temperature, reference temperature or both maximum and reference temperatures.

As shown in FIG. 20, a variable speed converter 42' has an arm 82' which may be identical to arm 82. Converter 42' also has an adjustment screw 54' which is identical to adjustment screw 54. Moreover, all the structures shown in FIG. 20 are identical to all the structures shown in FIG. 2 except those structures which have been omitted and only one added structure. This added structure is an adjustment plate 141' which is similar to get different from adjustment plate 141.

Adjustment plate 141' also has a tabe 165' which is very similar to the tab 165. A nut 166' is welded to tab 165' at 167', as before. Adjustment platae 141' has indicia 149' which may be identical to indicia 149. Adjustment plate 141' has a projection 187 at the end of which is provided a fork 188 having prongs 189 and 190 that straddle a pin 127' press fit into arm 82' and a location identical to that of pin 127 in arm 82. Pin 127' may be identical to pin 127, if desired. Fork 188, thus, straddles pin 127'.

Adjustment plate 141' has a clamp screw 162'. Clamp screw 162' projects through a slot 163 in adjustment plate 141', as before.

The word "variable," as used herein and in the claims in any of its grammatical forms, is hereby defined to include, but not be limited to, either the continuously variable and automatic increase or decrease in the eccentricity of the shaft 74 relative to shaft 87 by operation of the bellows assembly 115 or the manual adjustability of adjustment plates 141 and 141' by turning the adjustment screws 54 and 54'.

From the following, it will be appreciated that the spring pins 117 and 140 have a common axis when the temperature of the fluid flowing in pipe section 34 is equal to the constant reference temperature mentioned hereinbefore and hereinafter.

As will be evident, gear reducer 44 may be connected either from variable speed converter 42 to counter 43 or from the output shaft 39 of fluid motor 38 to variable speed converter 42.

The phrase "gear ratio" is hereby defined for use herein and in the claims to mean the ratio of two velocities if and when an input shaft is rotated. The phrase "gear ratio" is, therefore, hereby defined as aforesaid, to means the ratio of the output velocity to the input velocity of a device, if the input shaft thereto is rotated.

The phrase "gear ratio" is hereby defined as aforesaid, and is hereby defined further to mean a device having a rotatable input member and an output member which rotates at an angular velocity which is a function of the angular velocity of the input shaft thereto.

The phrase "gear ratio" as used herein is defined as aforesaid and is hereby defined further to mean either a device which utilizes a friction or other drive including, but not limited to, the use of a gear and pinion.

Figure 21:
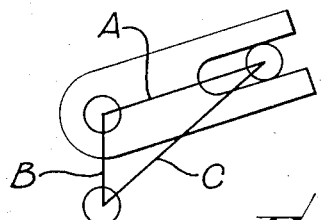
FIG. 21 is a diagrammatic view illustrating the geometry of the variable speed converter of the present invention.
Figure 22:
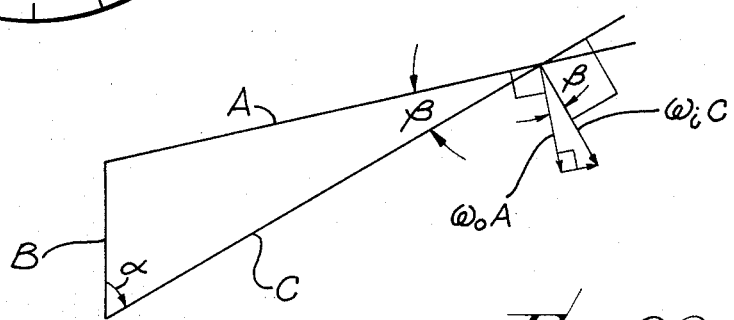
FIGS. 22 and 23 are diagrams illustrating the correlation between the various variables and constants of the variable speed converter of the present invention.

In FIGS. 21 and 22, A, B and C obviously represent the lengths of the sides of a triangle which is not a right triangle, i.e., it varies in size. The triangle leg A has a length which varies with time as shaft 87 is driven. Compare the structures of FIGS. 4 and 21. Sides A and C meet in an apex at the axis of pin 92. Sides A and B meet in an apex at the axis of shaft 87. Sides B and C meet at an apex at the axis of shaft 74. The angle $\alpha$ is the angle subtended by side A. Note that $\alpha$ is the first letter of the Greek alphabet and A is the first letter of the English alphabet. The angle $\beta$ is subtended by B.

The side B is the distance, if any, (always during operation) between the axes of shafts 74 and 87. The side B is the eccentricity of the axis of shaft 74 relative to that of shaft 87. The side C is always constant. So is the side B except during $\Delta T = 0$ or $T_s$ adjustment.

The Greek omega is often used to indicate angular velocity. That is what it is used for in this case. The term $\omega_o$ is the output angular velocity of side A. The term $\omega_i$ is the input angular velocity of the side C. The term $\omega_o A$ is therefore the tangential velocity component of the axis of a pin 92 normal thereto and normal to A. The term $\omega_i C$ is the tangential velocity component of C at the axis of pin 92 and normal thereto and to C.

In FIG. 22, by the law of cosines, $$A^2 = B^2 + C^2 - 2BC \cos \alpha \quad (1)$$

Also, $$\omega_i C = \omega_o A \sec \beta \quad (2)$$

If, $$\omega_o/\omega_i = R \quad (3)$$

$$R = C/A \sec \beta \quad (4)$$

By the law of sines,
$$\sin \beta/B = \sin \alpha/A \quad \text{and} \quad (5)$$

$$\sin \beta = (B/A) \sin \alpha \quad \text{and} \quad (6)$$

$$\cos \beta = \sqrt{1 - (B^2/A^2) \sin^2 \alpha} \quad (7)$$

Then,
$$A \cos \beta = \sqrt{A^2 - B^2 \sin^2 \alpha} \quad (8)$$

Substituting (1) in (8),
$$A \cos \beta = \sqrt{B^2 + C^2 - 2BC \cos \alpha - B^2 \sin^2 \alpha} \quad (9)$$

$$A \cos \beta = \sqrt{C^2 - 2BC \cos \alpha + B^2 \cos^2 \alpha} \quad (10)$$

$$A \cos \beta = C - B \cos \alpha \quad (11)$$

Combining (4) and (11),
$$R = (C/A)(C/A - B/A \cos \alpha) \quad (12)$$

If, $$K = B/C \quad (13)$$

From (1) and (12)

$$R = \left[\frac{1}{K^2 + 1}\right] \times \left[\frac{1 - K \cos \alpha}{1 - \frac{2K}{K^2 + 1} \cos \alpha}\right] \quad (14)$$

The average value of R is $R_a$ where $$R_a = \frac{1}{\theta} \int_0^\theta R \, d\alpha \quad (15)$$

In this case, $\theta = \pi/p + 1$, where $p$ is the number of equally spaced members 30, 31 and 32 in excess of one. The term $\pi$ is 3.1416. In this case $p = 2$, but $p$ may be equal to any other positive integer. The definite integral of (15) may be evaluated by simple integration thus, $$R_a = \left[\frac{1}{2}\right] \left[1 + \frac{2}{\theta} \arctan \left(\frac{1+K}{1-K}\right) \left(\tan \frac{\theta}{2}\right)\right] \quad (16)$$

To find out what the adjustment screw setting should be for a fluid at a variable temperature $T_e$ higher or lower than, for example, 60°F. ($T_s$) where $$\Delta T = T_e - T_s \quad (17)$$

$R_e$ is gear ratio and $V_e$ is volume at the same temperature $T_e$. Similarly $R_s$ and $V_s$ are at temperature $T_s$.

$$R_e V_e = R_s V_s \quad (18)$$

Figure 23:
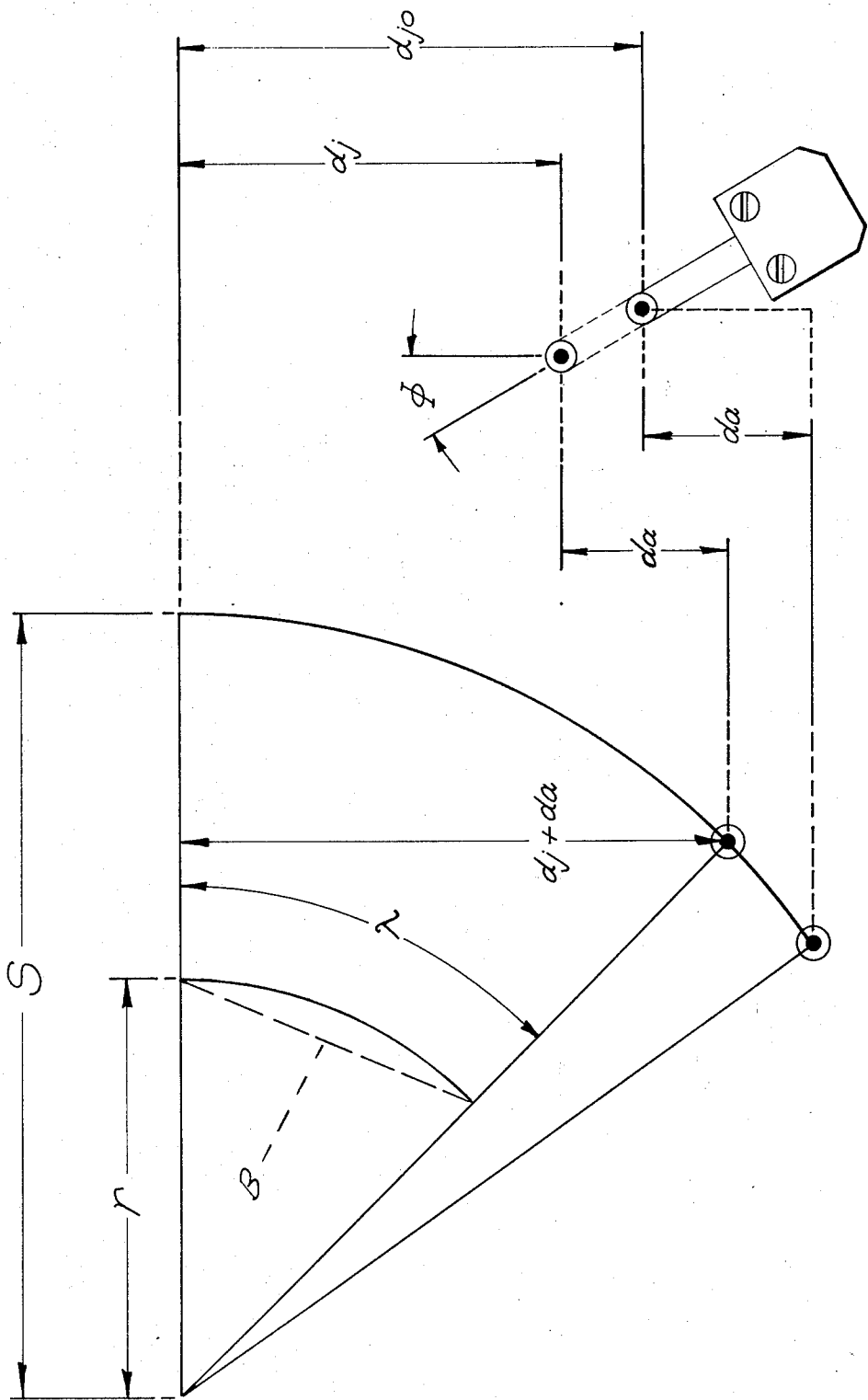

In FIG. 23, $B_s$ is the volume of the bulb housing divided by an area factor equal to about one-fourth the inside diameter squared at temperature $T_s$, and $K_b$ is the volume thermal expansion coefficient of the bellows fluid.

By definition, $d_j = d_{jo}$ when $\Delta T = 0$. The term $d_a$ is the distance between the axis of pin 127 and the axis of pin 140. The term $d_j$ is the vertical distance from a horizontal line through pin 83 as viewed in FIG. 2 to the axis of pin 117. The term $d_{jo}$ is the distance from a horizontal line through pin 83 as before to the axis of pin 140 when $\Delta T = 0$.

the gear reducer may have a variable gear ratio to provide an additional degree of freedom for curve fitting, if desired. However, this ratio $R_g$ may also be constant, if desired. The plate 141 shown in FIG. 2 then has a zero position shown in FIG. 2 (not operational) when $$d_{jo} = 0 \tag{19}$$

$$d_j = d_{jo} - B_s K_b \cos \phi \, \Delta T \tag{20}$$

$$R_s/R_e = V_e/V_s \tag{21}$$

$$V_e/V_s = 1 + K_f \Delta T \tag{22}$$

$$R_e = R_a \tag{23}$$

$$R_s/R_a = 1 + K_f \Delta T \tag{24}$$

the term $R_s$ is the gear ratio at $\Delta T = 0$.

$$d_j = d_{jo} - B_s K_b \cos \phi \, \Delta T \tag{25}$$

The term $\phi$ is the angle the axis of the bellows pin 156 makes with a plane perpendicular to the paper through a horizontal line through the axis of pin 83 in FIG. 2.

The term $s$ is the distance from the axis of pin 83 in FIG. 2 to the axis of pin 127. The term $\lambda$ is the angle between a horizontal line in FIG. 2 through the axis of pin 83 and a line normal to that axis and to the axis 127. The term $r$ is the distance from the axis of pin 83 to the axis of shaft 74.

$$(d_j + d_a)/s = \sin \lambda \tag{26}$$

$$B/2r = \lambda/2 \tag{27}$$

$$\sin \lambda = 2 \sin \lambda/2 \cos \lambda/2 \tag{28}$$

$$(d_j + d_a)/s = (B/r)(1 - B^2/4r^2)^{1/2} \tag{29}$$

$$B = r\sqrt{2\left(1 - \sqrt{1 - \frac{[d_j + d_a]^2}{s^2}}\right)} \tag{30}$$

$$K = \sqrt{2D^2\left(1 - \sqrt{1 - \left(\frac{d_a + d_{jo} - B_s K_b \Delta T}{s}\right)^2}\right)} \tag{31}$$

$$K = \sqrt{2D^2(1 - \sqrt{1 - (E - F_o T)^2})} \tag{32}$$

where $$D = r/C \tag{33}$$

$$E = (d_{jo} + d_a)/s \tag{34}$$

and $$Fo = B_s K_b \cos \phi/s \tag{35}$$

From (16), $$R_a = [1/2][1 + 2/\theta \arctan(1 + K/1 - K)(\tan \theta/2)] \tag{36}$$

Defining $$R = 1/f_a(K) \tag{37}$$

$$f_a(K) = 2/[1 + 2/\theta \arctan(1 + K)/(1 - K)(\tan \theta/2)] \tag{38}$$

Defining $f_a'(K_o)$ the derivative of $f_a(k)$ with respect to $K$ at $K = K_o$, $$f_a'(K_o) = \frac{\left(-\frac{8}{\theta}\right)\left(\tan \frac{\theta}{2}\right)}{[1-K_o]^2\left[1+\left(\frac{1+K_o}{1-K_o}\right)^2\left(\tan \frac{\theta}{2}\right)^2\right]}$$
$$\times \frac{1}{\left[1+\frac{2}{\theta}\arctan\left(\frac{1+K_o}{1-K_o}\right)\left(\tan \frac{\theta}{2}\right)\right]^2} \tag{39}$$

where $$K_o = \sqrt{2D^2(1 - \sqrt{1 - E^2})} \tag{40}$$

Defining $$K = f_x(x) \tag{41}$$

where $$f_x(x) = \sqrt{2D^2(1 - \sqrt{1 - x^2})} \tag{42}$$

where $$D = r/C \tag{43}$$

and $$x = E - F_o \Delta T \tag{44}$$

where $$E = (d_{jo} + d_a)/s \tag{45}$$

and $$F_a = B_s K_b \cos \phi/s \tag{46}$$

Defining $f_x'(x_o)$ equal to the first derivative of $f_x(x)$ with respect to $x$ at $x = x_o$, where $$x_o = E \ (\Delta T = 0) \tag{47}$$

$$f_x'(x_o) = \frac{D^2 E}{[1-E^2]^{1/2} [2D^2(1-\sqrt{1-E^2})]^{1/2}} \quad (48)$$

Defining $$x = f_t(\Delta T) \quad (49)$$

where $$f_t(\Delta T) = E - F_o \Delta T \quad (50)$$

Thus $f_t'(0)$ is the first derivative of $f_t(\Delta T)$ with respect to $\Delta T$ at $\Delta T = 0$.

$$f_t'(0) = -F_o \quad (51)$$

$$R_s = [\tfrac{1}{2}][1 + 2/\theta \arctan(1+K_o)/(1-K_o)(\tan \theta/2)] \quad (52)$$

Note $R_s = 1/f_a(K_o)$ or the reciprocal of $f_a(K)$ at $K = K_o$.

Redefining $$H = f_a'(K_o) \quad (53)$$

$$L = f_x'(x_o) \quad (54)$$

$$K_f = - HLF_o R_s \quad (55)$$

$$K_f = (- HLR_s B_s K_b \cos \phi)/s \quad (56)$$

Defining $$W_a = - s/(HLR_s B_s K_b) \quad (57)$$

$W_a$ is positive because $H$ is negative. $W_a$ changes very little with $E$ but may be selected for $E$ midranage, if desired. Midrange $E$ may be defined by $(d_a + d_{joo})/2$ at $\Delta T = 0$, where $d_{joo}$ produces $R_a \cong 1.14$.

$$\phi = \arccos W_a K_f \quad (58)$$

The term $\phi$ may be calibrated in increments of an arbitrary $K_{fo}$ such as 1 percent per 100° Fahrenheit in accordance with the last equation.

Case 145 preferably is made of a material having a thermal coefficient of expansion approximately equal to that of the fluid inside to compensate for changes in ambient temperature.

The word "average" is hereby defined for use herein and for use in the claims as the definite integral of the amplitude of a variable between upper and lower limits divided by the difference between the selfsame limits.

What is claimed is:

1. A flowmeter comprising: a section of pipe to carry a fluid to be metered, said pipe section having a wall; a fluid motor connected with said pipe section, said fluid motor having an output shaft, said fluid motor being constructed to rotate said output shaft thereof at an angular velocity approximately proportional to the rate of volume flow of said fluid therethrough; a speed converter having an input shaft and an output shaft, said speed converter being connected in a manner such that the input shaft thereof is rotated at an angular velocity directly proportional to that of said fluid motor output shaft; output means connected from said converter output shaft, the average gear ratio of said converter being $R_a$ over one revolution of said converter input shaft; and control means connected with said converter for varying the magnitude of $R_a$, said control means including a plate, said converter including a housing, an arm pivoted on said housing, said converter input shaft being rotatable about an axis parallel to the pivot axis of said arm, said converter input shaft being mounted in a fixed axial but rotatable angular position through said arm, said arm having a pin spaced from the pivot axis thereof, a plate having a fork with a slot therein, said fork being fixed with said plate in a position straddling said pin, said plate having a slot therein, said slot having a uniform width and lengthwise direction running normal to a plane through said arm pivot axis and said converter output shaft axis, a releasable clamp screw extending through said plate slot and threaded into said housing, said clamp screw having a shank with a diameter slightly smaller than said plate slow width, a nut fixed relative to said plate with an axis parallel to the length dimension of said plate slot, and an adjustment screw threaded through said nut, said adjustment screw being held in a fixed axial but rotatable angular position on said housing.

2. A flowmeter comprising: a fluid motor for mounting in a pipeline containing a metered fluid, said fluid motor having an output shaft; a temperature sensor including a hollow bulb containing a thermally expansible and contractable control fluid, said bulb being adapted for mounting in the same said pipeline; a variable speed converter; a capillary tube having one end connected from said bulb to said converter, said fluid motor output shaft also being connected to said converter, said converter having an output shaft and being constructed to cause the said output shaft thereof to rotate at a speed directly proportional to a mass flow rate which is independent of the metered fluid temperature, said converter having a base and a mechanism mounted on said base and actuable to change the angular velocity of the output shaft thereof relative to the angular velocity of said fluid motor output shaft, said converter having an arm pivoted to said base and connected to said mechanism to cause said change when said arm is moved about its pivot, said arm having a central position at which the angular velocity of said converter output shaft is equal to the angular velocity of said fluid motor output shaft; a bellows assembly having a pin, said capillary tube having its other end connected to said bellows, said pin being axially movable upon heating and cooling of said bulb, said pin having an axis in a plane normal to the pivot axis of said arm; a linkage connecting said pin at a point to said arm to rotate said arm; adjustable means to mount said bellows assembly on said base, said adjustable means including first apparatus to guide movement of said bellows assembly for rotation about an axis parallel to the pivot axis of said arm through said point, and second releasable apparatus to clamp said bellows assembly in a fixed position relative to said base corresponding to the relative thermal coefficients of expansion of said metered and control fluids, said bellows assembly being positioned to reduce the ratio of the angular velocity of the output shaft of said converter to that of the output shaft of said fluid motor when said metered fluid temperature increases, and vice versa; and utilization means connected from said converter output shaft.

3. The invention as defined in claim 2, wherein said housing has a wall with a hole therethrough, said adjustment screw having a cylindrical shank portion extending through said hole contiguous to the cylindrical surface defining the same, a flange fixed to said adjustment screw in a position to abut the external surface of said housing and to prevent axial movement of said adjustment screw into said housing, said adjustment screw having an annular groove therein inside said housing, a snap ring in said groove, and a Belleville spring in axial compression between said ring and the internal surface of said housing around said adjustment screw.

4. The invention as defined in claim 3, wherein said flange includes an annular disc, said adjustment screw having a threaded end portion of a diameter less than an intermediate portion thereof, which portions meet at a shoulder, said flange being in engagement with said shoulder, and a lock nut threaded to said end portion fixing said disc relative to said adjustment screw.

5. The invention as defined in claim 4, wherein said disc and said housing have correlatable indicia thereon.

6. The invention as defined in claim 5, wherein said plate has indicia thereon correlatable with the position of said adjustment screw relative to said plate.

7. The invention as defined in claim 6, wherein said utilization means includes display means to indicate an angle directly proportional to that through which said converter output shaft turns.

8. The invention as defined in claim 7, wherein said display means includes a revolutions counter calibrated in gallons.

9. The invention as defined in claim 2, wherein said utilization means includes a gear reducer and a counter connected in succession in that order from said converter output shaft.

10. The invention as defined in claim 9, wherein said adjustable means also includes third apparatus slidable on said base in a direction normal to a plane running centrally through said arm and through the pivot axis of said arm, and means to clamp said third apparatus in a fixed position relative to said base corresponding to a standard temperature.

11. The invention as defined in claim 2, wherein said adjustable means also includes third apparatus slidable on said base in a direction normal to a plane running centrally through said arm and through the pivot axis of said arm, and means to clamp said third apparatus in a fixed position relative to said base corresponding to a standard temperature.

12. The invention as defined in claim 2, wherein said bellows assembly rotational axis is coincident with said bellows assembly pin axis at a predetermined reference temperature, said converter output shaft always rotating at a speed directly proportional to what the volume flow rate of the same mass in the pipeline would be at said reference temperature.

* * * * *